(12) United States Patent
Toosky et al.

(10) Patent No.: US 7,575,404 B2
(45) Date of Patent: *Aug. 18, 2009

(54) NUT PLATE FASTENER ASSEMBLY FOR COMPOSITE MATERIALS

(75) Inventors: Rahmatollah Fakhri Toosky, San Clemente, CA (US); Soheil Eshraghi, Irvine, CA (US)

(73) Assignee: SPS Technologies, LLC, Jenkintown, PA (US)

( * ) Notice: Subject to any disclaimer, the term of this patent is extended or adjusted under 35 U.S.C. 154(b) by 115 days.

This patent is subject to a terminal disclaimer.

(21) Appl. No.: 11/874,347

(22) Filed: Oct. 18, 2007

(65) Prior Publication Data

US 2008/0101887 A1    May 1, 2008

Related U.S. Application Data

(60) Provisional application No. 60/863,828, filed on Nov. 1, 2006.

(51) Int. Cl.
    *F16B 37/06* (2006.01)
(52) U.S. Cl. .......................... 411/113; 411/69; 411/501
(58) Field of Classification Search ......... 411/111–113, 411/969, 69, 501; 29/523, 507
    See application file for complete search history.

(56) References Cited

U.S. PATENT DOCUMENTS

| | | | |
|---|---|---|---|
| 177,665 A | 5/1876 | Smith | |
| 1,107,544 A | 8/1914 | Ogden | |
| 1,138,345 A | 5/1915 | Zifferer | |
| 1,409,606 A * | 3/1922 | Stendahl | 411/353 |
| 1,413,998 A | 4/1922 | Templeton | |

(Continued)

FOREIGN PATENT DOCUMENTS

CH    277209    8/1951

(Continued)

OTHER PUBLICATIONS

Aerospace Fasteners Numerical Listing of Parts 1995 Edition 21 pages.

(Continued)

*Primary Examiner*—Flemming Saether
(74) *Attorney, Agent, or Firm*—Trexler, Bushnell, Giangiorgi, Blackstone & Marr, Ltd

(57) ABSTRACT

A rivetless nut plate assembly, which is fully preassembled, which can be installed into an aperture of a composite material workpiece, such as a carbon fiber structure, without risking delamination of the workpiece. The rivetless nut plate assembly includes a nut, a holding bracket, a retainer, and a sleeve member. Additionally, a stem is used to install the rivetless nut plate assembly. The sleeve member is configured such that the nut plate assembly can be installed in a composite material workpiece without risking delamination. The sleeve member may be formed of 45Cb-55Ti Titanium Columbium, as Titanium Columbium is a high strength and ductile material that resists corrosion in the presence of, for example, a carbon fiber composite structure. Monel, Titanium alloys, and other soft Nickel alloys are also good material selections for the sleeve, for similar reasons. Non-metallic materials with high tensile and shear strengths, such as Torlon or Parmax, would provide the desired corrosion protection and also offer a potential weight savings.

18 Claims, 20 Drawing Sheets

U.S. PATENT DOCUMENTS

| | | | |
|---|---|---|---|
| 1,966,835 A | 7/1934 | Stites | |
| 2,078,411 A | 4/1937 | Richardson | |
| 2,146,461 A | 2/1939 | Bettington | |
| 2,150,361 A | 3/1939 | Chobert | |
| 2,249,923 A | 7/1941 | Whitcombe | |
| 2,304,107 A | 12/1942 | Leisure | |
| 2,333,386 A | 11/1943 | Murphy | |
| 2,366,956 A | 1/1945 | Clausen | |
| 2,366,965 A * | 1/1945 | Johnson | 411/15 |
| 2,410,398 A * | 10/1946 | Williams, Jr. et al. | 411/501 |
| 2,413,669 A | 12/1946 | Whitcombe | |
| 2,421,201 A | 5/1947 | Hallock | |
| 2,438,044 A | 3/1948 | Freesz | |
| 2,477,429 A | 7/1949 | Swanstrom et al. | |
| 2,560,961 A | 7/1951 | Knohl | |
| 2,649,883 A | 8/1953 | Sharp | |
| 2,802,503 A | 8/1957 | Zupa | |
| 2,825,380 A | 3/1958 | Reiner | |
| 2,976,080 A | 3/1961 | Moore | |
| 2,986,188 A | 5/1961 | Karp et al. | |
| 3,025,897 A | 3/1962 | Gieleghem | |
| 3,126,039 A | 3/1964 | Fiddler | |
| 3,177,916 A | 4/1965 | Rosan | |
| 3,180,387 A | 4/1965 | Dzus et al. | |
| 3,252,493 A * | 5/1966 | Smith | 411/108 |
| 3,305,987 A | 2/1967 | Weaver | |
| 3,316,953 A | 5/1967 | Fransson et al. | |
| 3,537,499 A | 11/1970 | Dey et al. | |
| 3,556,570 A | 1/1971 | Cosenza | |
| 3,566,662 A | 3/1971 | Champoux | |
| 3,657,957 A | 4/1972 | Siebol | |
| 3,670,796 A | 6/1972 | Grimm | |
| 3,695,324 A | 10/1972 | Gulistan | |
| 3,698,278 A * | 10/1972 | Trembley | 411/34 |
| 3,765,078 A | 10/1973 | Gulistan | |
| 3,785,421 A | 1/1974 | Launay | |
| 3,825,146 A | 7/1974 | Hirmann | |
| 4,010,519 A * | 3/1977 | Worthing | 403/404 |
| 4,015,650 A | 4/1977 | Anderson | |
| 4,164,807 A * | 8/1979 | King, Jr. | 29/523 |
| 4,186,787 A | 2/1980 | Husain | |
| 4,187,708 A | 2/1980 | Champoux | |
| 4,193,435 A | 3/1980 | Charles et al. | |
| 4,221,041 A | 9/1980 | Hufnagl et al. | |
| 4,227,561 A | 10/1980 | Molina | |
| 4,295,766 A | 10/1981 | Shaw | |
| 4,329,768 A | 5/1982 | Tranberg et al. | |
| 4,405,256 A | 9/1983 | King, Jr. | |
| 4,423,619 A | 1/1984 | Champoux | |
| 4,425,780 A | 1/1984 | Champoux | |
| 4,471,643 A | 9/1984 | Champoux et al. | |
| 4,557,033 A | 12/1985 | Champoux | |
| 4,557,650 A | 12/1985 | Molina | |
| 4,695,212 A | 9/1987 | Berecz | |
| 4,732,518 A | 3/1988 | Toosky | |
| 4,762,451 A | 8/1988 | Collins | |
| 4,768,907 A | 9/1988 | Gauron | |
| 4,781,501 A | 11/1988 | Jeal et al. | |
| 4,790,701 A | 12/1988 | Baubles | |
| 4,826,374 A | 5/1989 | Baglin | |
| 4,828,440 A | 5/1989 | Anderson et al. | |
| 4,830,557 A | 5/1989 | Harris et al. | |
| 4,863,327 A | 9/1989 | Poupiter | |
| 4,875,816 A | 10/1989 | Peterson | |
| 4,884,420 A | 12/1989 | Finkel et al. | |
| 4,885,829 A | 12/1989 | Landy | |
| 4,895,484 A | 1/1990 | Wilcox | |
| 4,934,170 A | 6/1990 | Easterbrook et al. | |
| 4,934,886 A | 6/1990 | Aikens | |
| 4,977,663 A * | 12/1990 | Hurd | 29/525.04 |
| 5,066,180 A | 11/1991 | Lang et al. | |
| 5,078,294 A | 1/1992 | Staubli | |
| 5,083,363 A | 1/1992 | Ransom et al. | |
| 5,096,349 A | 3/1992 | Landy et al. | |
| 5,096,350 A | 3/1992 | Peterson | |
| 5,103,548 A | 4/1992 | Reid et al. | |
| 5,127,254 A | 7/1992 | Copple et al. | |
| 5,146,668 A | 9/1992 | Gulistan | |
| 5,193,643 A | 3/1993 | McIntyre | |
| 5,245,743 A | 9/1993 | Landy et al. | |
| 5,305,627 A | 4/1994 | Quincey et al. | |
| 5,341,559 A | 8/1994 | Reid et al. | |
| 5,380,136 A | 1/1995 | Copple et al. | |
| 5,405,228 A | 4/1995 | Reid et al. | |
| 5,433,100 A | 7/1995 | Easterbrook et al. | |
| 5,468,104 A | 11/1995 | Reid et al. | |
| 5,630,686 A | 5/1997 | Billmann | |
| 5,704,747 A | 1/1998 | Hutter, III et al. | |
| 5,716,178 A | 2/1998 | Vu | |
| 5,730,540 A * | 3/1998 | Duran et al. | 403/21 |
| 5,893,694 A | 4/1999 | Wilusz et al. | |
| 5,947,518 A | 9/1999 | Redman et al. | |
| 6,077,010 A | 6/2000 | Reid et al. | |
| 6,146,071 A | 11/2000 | Norkus et al. | |
| 6,183,180 B1 | 2/2001 | Copple et al. | |
| 6,439,816 B1 | 8/2002 | Nance et al. | |
| 7,059,816 B2 * | 6/2006 | Toosky | 411/181 |
| 7,100,264 B2 * | 9/2006 | Skinner et al. | 29/523 |
| 7,114,900 B2 * | 10/2006 | Toosky | 411/108 |

FOREIGN PATENT DOCUMENTS

FR             2740184        4/1997

OTHER PUBLICATIONS

Fatigue Improvement by Sleeve Coldworking by Joseph L. Phillips, Oct. 1973—13 pages.

* cited by examiner

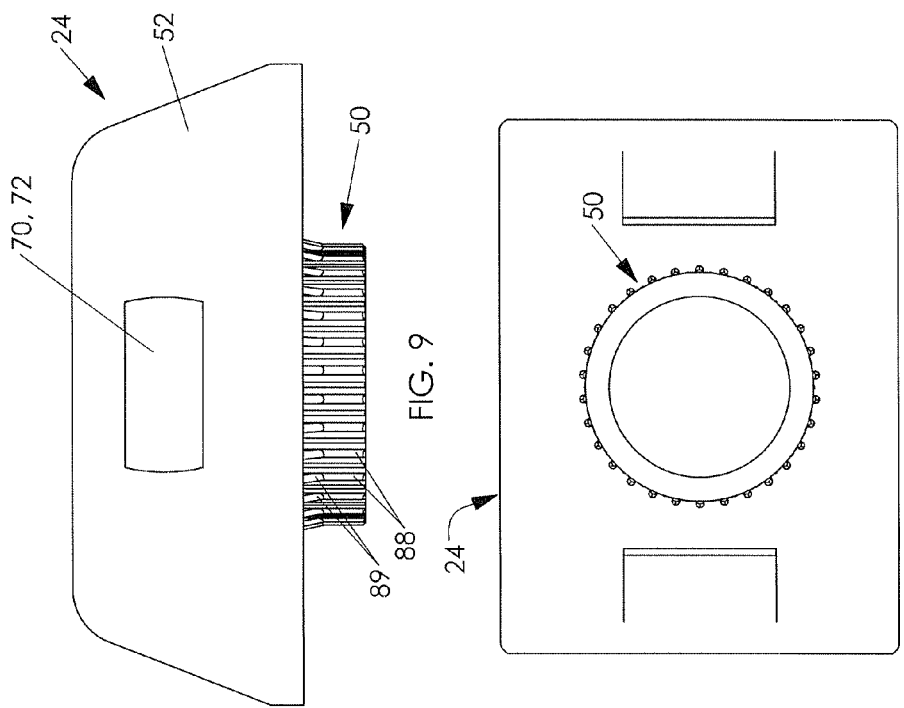
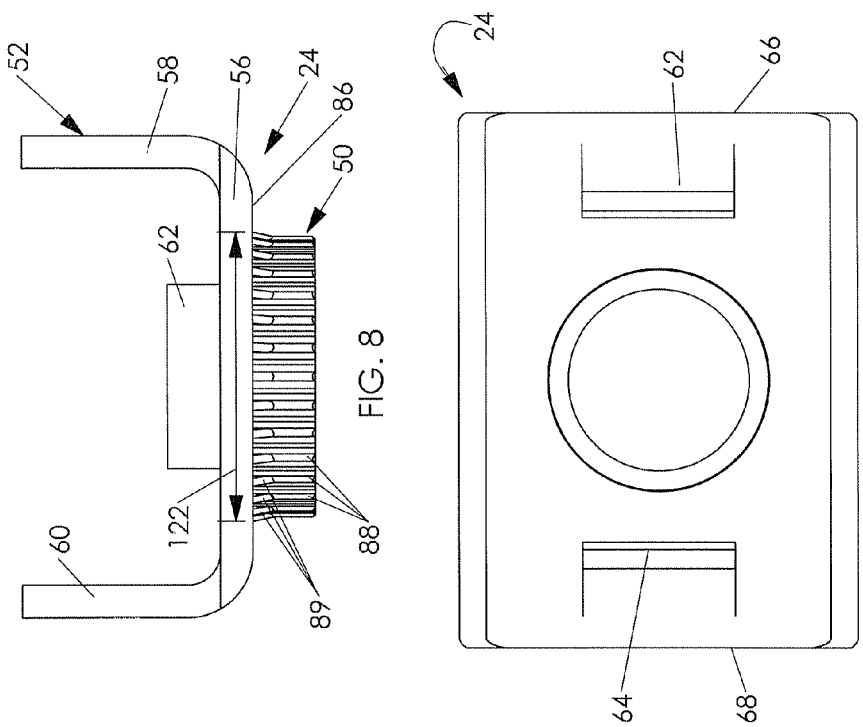

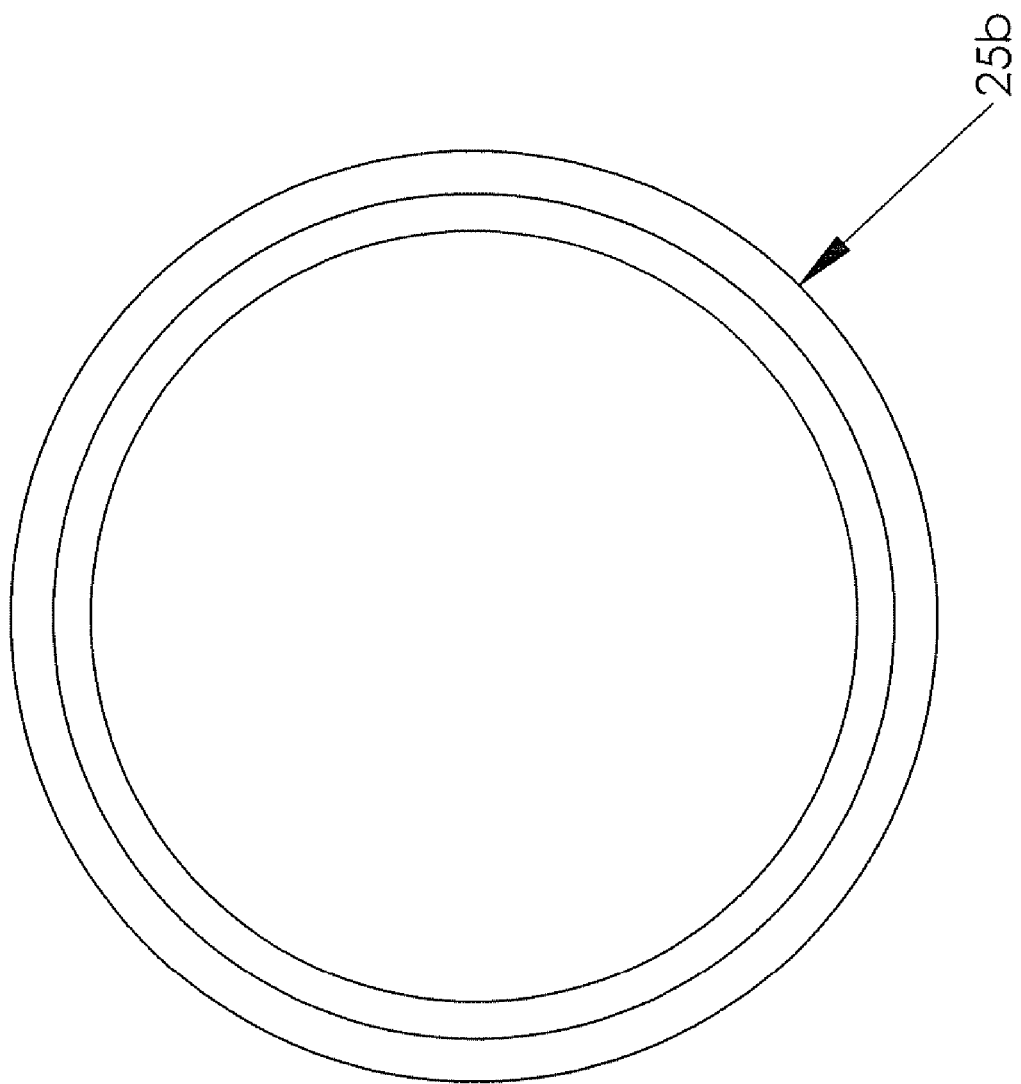

NUT PLATE FASTENER ASSEMBLY FOR COMPOSITE MATERIALS

RELATED APPLICATION (PRIORITY CLAIM)

This application claims the benefit of U.S. Provisional Application Ser. No. 60/863,828, filed Nov. 1, 2006, which is hereby incorporated herein by reference in its entirety.

BACKGROUND OF THE INVENTION

The present invention generally relates to nut plate fastener assemblies, and more specifically relates to a rivetless nut plate fastener assembly which is configured for use with a composite material workpiece.

Fasteners are used in the aerospace industry for securing at least two workpieces together. Fasteners used in such installations may include a nut plate and a nut which are part of an assembly. There are many different design configurations of nut plates being used today. Two major classes are riveted nut plates and rivetless nut plates.

In riveted nut plates, two rivets are employed for attaching the body of the nut plate to the workpiece. To eliminate the potential for leakage through the openings of the riveted nut plates, sealant is used between the workpiece and the nut plate.

With regard to rivetless nut plates, some designs provide that a sleeve is flared against a workpiece. One example of this type of rivetless nut plate is disclosed in U.S. Pat. No. 4,732,518, which is hereby incorporated herein by reference in its entirety. The '518 patent illustrates the insertion of a sleeve inside a workpiece against heavy interference forces and then deformation of the sleeve to produce flaring of the end of the sleeve. The sleeve has a serration/lobe configuration thereon with the serration/lobe configuration being long and tapered such that the serrations/lobes extend into the walls of the workpiece. The tapered feature, length and specific geometry are necessary to make installation possible with the method of installation which was chosen for its application. The main object of the '518 patent with its tapered and extended serration/lobe configuration was to enhance the fatigue life of the workpiece by distributing the load throughout the workpiece and providing expansion due to the insertion of the sleeve into the workpiece, and to cold work the material adjacent the perimeter of the workpiece aperture.

Other nut plate designs do not rely on flaring of the sleeve. U.S. Pat. Nos. 5,096,349, 5,245,743, 5,405,228; 7,059,816 and pending U.S. patent application Ser. No. 10/929,701 (filed Aug. 30, 2004) disclose rivetless nut plate designs which do not rely on flaring of the sleeve, and these five items are hereby incorporated herein by reference in their entirety. While some rivetless nut plate designs rely on adhesive for attaching the nut plate to the structure, the designs disclosed in the five items cited above rely on heavily cold-worked holes and high interference engagement utilizing a hardened pin as the installation tool to expand a sleeve element into engagement with a workpiece structure. Because of high level expansion, the friction forces created are intended to retain the nut plate and provide expected mechanical properties.

Currently within the aerospace industry, the rivetless nut plate disclosed in U.S. Pat. No. 7,059,816 is becoming more and more predominate within aluminum structure applications, taking the place of outdated nut plates utilizing satellite rivets. This is due to the time saving nature of the rivetless nut plate, while still maintaining the mechanical properties for torque out and push out as required by NASM25027.

This rivetless nut plate works by pulling a mandrel through the inside diameter of a nut plate retainer which has been placed in a pre-drilled hole, expanding the fastener sleeve radially in the hole. This radial expansion of the fastener sleeve in the work piece embeds the sleeve with its complex lobe design into the pre-drilled hole and creates the interlocking action between the nut plate and the structure required to resist torque out and push out.

Unfortunately, with composite structures, the introduction of holes in the material and subsequently fasteners in those holes, create unique problems not existing with most aerospace structural materials. Due to the properties of composites, too much radial expansion of the work hole caused by the fastener sleeve leads to delamination of the composite, while too little radial expansion hampers proper shear load transfer. A solution is needed. Thus, the present invention deals with rivetless nut plates for installation in composite structures.

While it seems that there is no current approach to modifying a rivetless nut plate such that it is useable with composite material workpieces, there is an approach using the outdated nut plate with satellite rivets. This approach requires drilling and reaming operations for their holes, or it needs to be accompanied with a bonding agent. Due to the nature of composite material, each drilled hole, as well as each additional installed fastener, endangers the integrity of the structure. Performing the drilling process in the composite material is difficult and costly, and can also damage the structure by exposing fibers to water absorption problems, while each installed fastener can damage the composite structure due to overfill conditions. In overfill conditions, the excessive radial expansion of the fastener can lead to delamination of the composite structure. Finally, the integrity of the bonding process is not easily verifiable and it can deteriorate due to environmental changes such as heat, moisture and chemicals.

Thus, an embodiment of the present invention aims to fasten a rivetless nut plate to a composite structure without the use of bonding agents, additional holes or satellite rivets, and without damaging the structure.

OBJECTS AND SUMMARY OF THE INVENTION

An object of an embodiment of the present invention is to provide a rivetless nut plate assembly which can be installed into an aperture of a composite material workpiece without risking delamination of the workpiece.

Another object of an embodiment of the present invention aims to fasten a rivetless nut plate to a composite structure without the use of bonding agents, additional holes or satellite rivets, and without damaging the structure.

Briefly, and in accordance with the foregoing, an embodiment of the present invention provides a rivetless nut plate assembly, which is fully preassembled, which can be installed into an aperture of a composite material workpiece, such as a carbon fiber structure, without risking delamination of the workpiece. The rivetless nut plate assembly includes a nut, a holding bracket, a retainer, and a sleeve member. Additionally, a stem is used to install the rivetless nut plate assembly. The sleeve member is configured such that the nut plate assembly can be installed in a composite material workpiece without risk of delamination. The sleeve member may be formed of 45Cb-55Ti Titanium Columbium, as Titanium Columbium is a high strength and ductile material that resists corrosion in the presence of, for example, a carbon fiber composite structure. Monel, Titanium alloys, and other soft Nickel alloys are also good material selections for the sleeve, for similar reasons. Non-metallic materials with high tensile and shear strengths, such as Torlon or Parmax, would provide the desired corrosion protection and also offer a potential weight savings.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 8 is an front elevational view of a holding bracket component of the nut plate assembly;

FIG. 9 is a side elevational view of the holding bracket component;

FIG. 10 is a top plan view of the holding bracket component;

FIG. 11 is a bottom plan view of the holding bracket component;

FIG. 12b is a top (and bottom) view of the alternative sleeve component shown in FIG. 12a;

FIG. 19a is a top view of the alternative sleeve component shown in FIG. 19;

DETAILED DESCRIPTION OF THE ILLUSTRATED EMBODIMENTS

Figure 1:
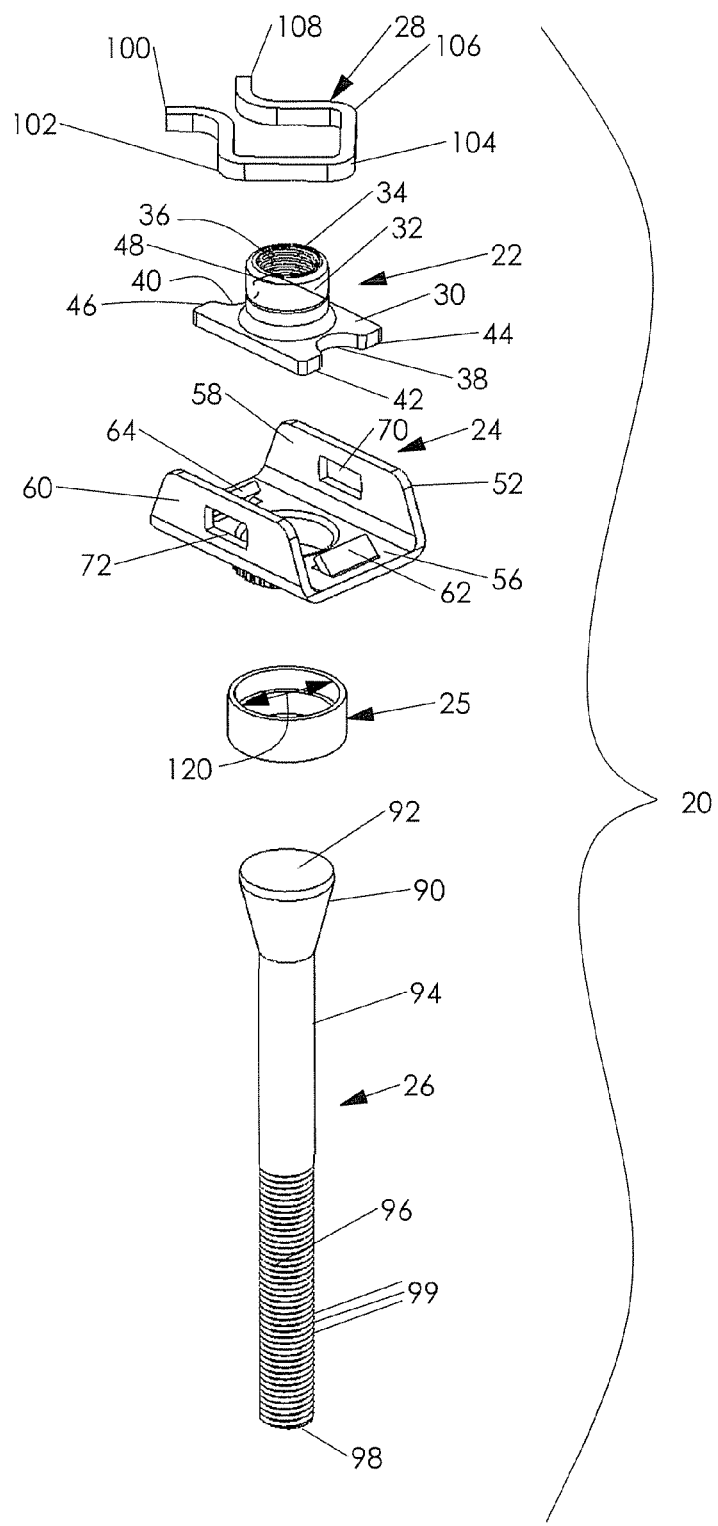
FIG. 1 is an exploded perspective view of a nut plate assembly which is in accordance with an embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

FIG. 1 is an exploded perspective view of a rivetless nut plate assembly 20 which is in accordance with an embodiment of the present invention. The rivetless nut plate assembly 20 is configured such that it can be installed into an aperture of a composite material workpiece without risking delamination of the workpiece, and can be installed without having to use bonding agents, additional holes or satellite rivets.

The nut plate assembly 20 includes a nut 22, a holding bracket 24, a sleeve 25 and a retainer 28. Additionally, before installation, the nut plate assembly 20 includes a stem 26 that is used to install the nut plate assembly 20 into an aperture 112 in a composite material workpiece 110.

The nut 22 includes a base portion 30 and a portion 32 which extends upwardly therefrom, which is generally cylindrical in configuration. An aperture 34 is provided through the base portion 30 and the portion 32 which defines an aperture wall 36. The aperture wall 36 is generally threaded such that a fastener, such as a bolt, can be attached thereto. The base portion 30 includes end recesses 38, 40 and axially projecting end portions 42, 44 and 46, 48 situated on opposite sides of the recesses 38, 40, respectively.

As shown in FIGS. 2-9, the holding bracket 24 is generally Y-shaped in front elevation and includes a tubular portion 50 and a bracket portion 52 which extends outwardly from the tubular portion 50 at a first end 54 thereof. The bracket portion 52 includes a base portion 56 and opposed upstanding side walls 58, 60. The base portion 56 has a pair of protrusions 62, 64 which protrude upwardly from the base portion 56. Protrusion 62 is provided proximate to edge 66 of the base portion 56 and protrusion 64 is provided proximate to edge 68 of the base portion 56. Slots 70, 72 extend through the side walls 58, 60 of the bracket portion 52.

Figure 3:
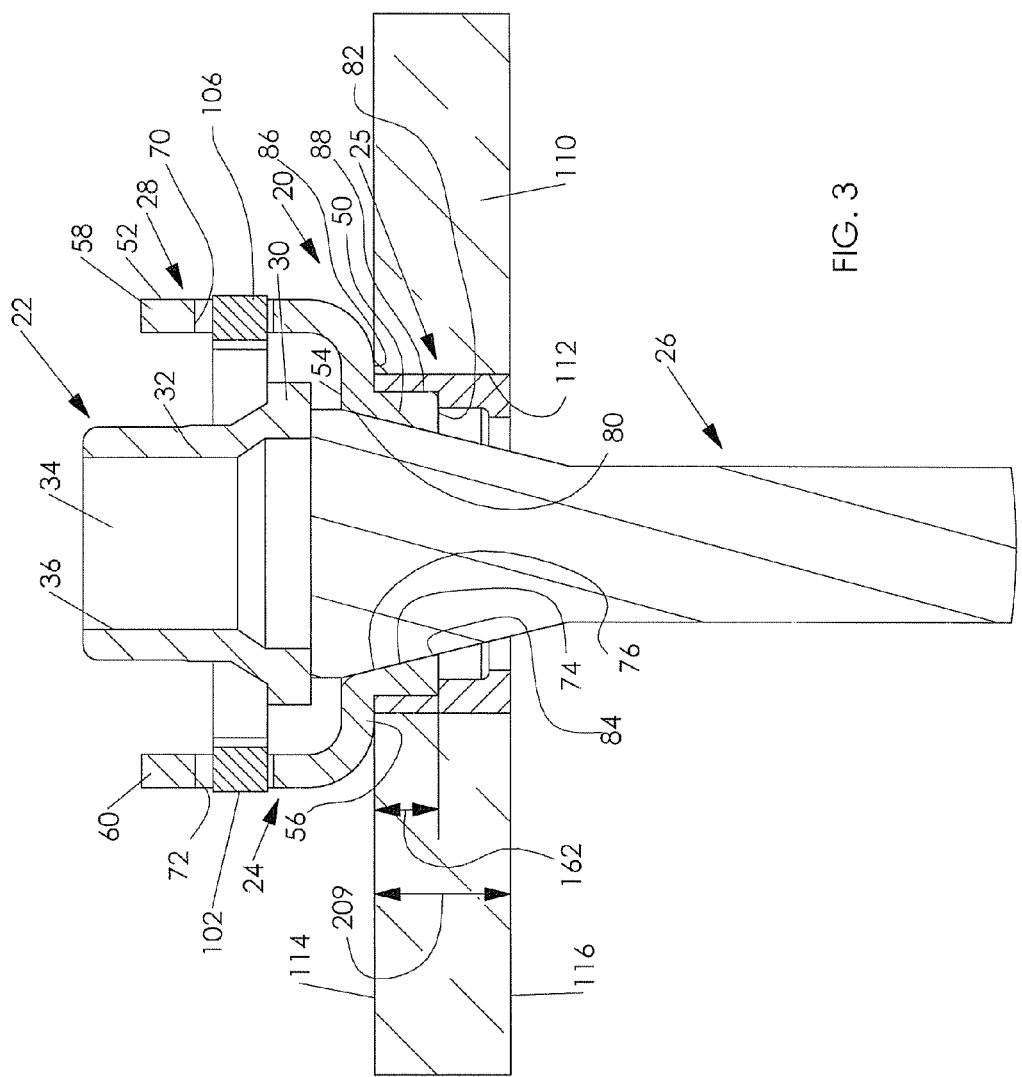
FIG. 3 is similar to FIG. 2, showing a portion thereof enlarged.
Figure 5:
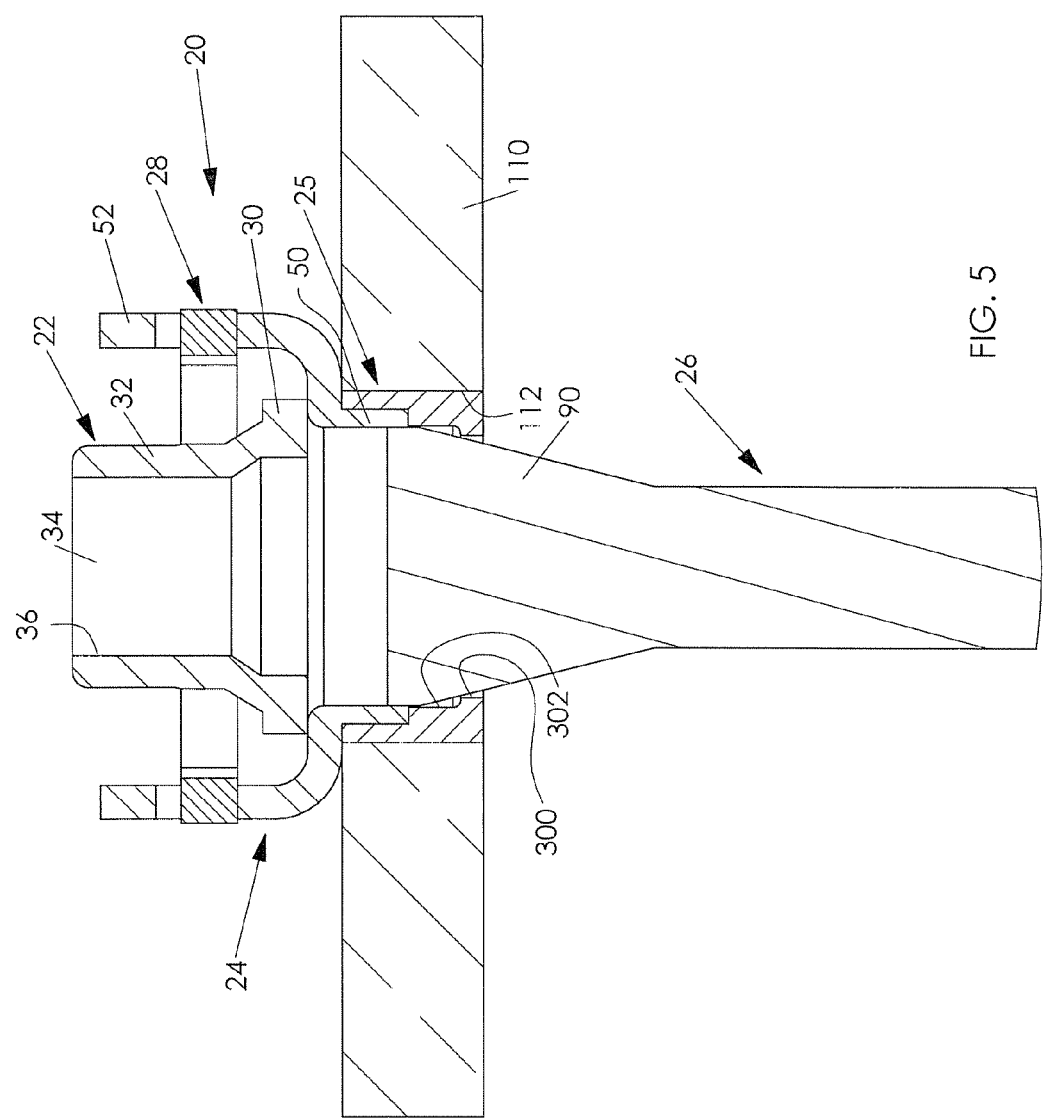
FIG. 5 is similar to FIG. 4, showing a portion thereof enlarged.

The tubular portion 50 extends in the opposite direction from the base portion 56 of the bracket portion 52 than do the side walls 58, 60 and the protrusions 62, 64 of the bracket portion 52. The tubular portion 50 has an aperture 74 therethrough which defines an inner wall 76 of the tubular portion 50. The tubular portion 50 also has an outer wall 78. From the first end 54 of the tubular portion 50, the inner wall 76 preferably curves inwardly to provide a shoulder 80. From the shoulder 80 to a second end 82 of the tubular portion 50, the inner wall 76 is preferably tapered or stepped such that the diameter of the inner wall 76 is gradually reduced, as illustrated in FIG. 5. If desired, the inner wall 76 need not be tapered. Additionally, preferably the inner wall 76 is configured to have a lip 84 provided proximate to the second end 82, as illustrated in FIG. 3, which further reduces the diameter of the inner wall 76. The lip 84 is shown with the inner wall 76 being tapered.

The outer wall 78 of the tubular portion 50 extends from an undersurface 86 of the bracket portion 52 to the second end 82 of the tubular portion 50. Lobes or ribs 88 extend outwardly from the outer wall 78 of the tubular portion 50 if desired, and each lobe or rib 88 may be provided with an upper angled surface 89. The purpose for the lobes/ribs 88 and upper angled surfaces 89 will be discussed further later herein.

Figure 15:
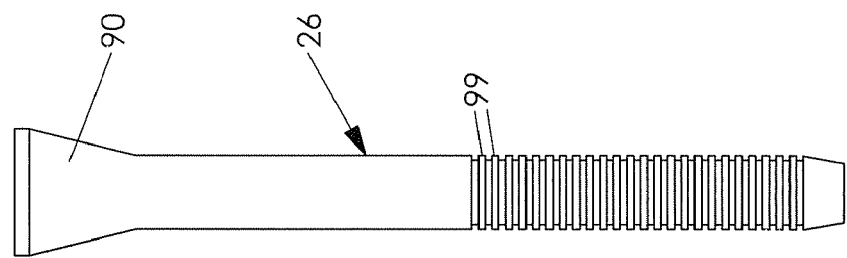

The stem 26 includes an enlarged head portion 90 at a first end 92 thereof and an elongated portion 94, which is preferably cylindrical, which extends from the enlarged head portion 90. The enlarged head portion 90 tapers to the elongated portion 94. The elongated portion 94 has a tool engaging section 96 proximate to a second end 98 of the stem 26, which may include annular lobes 99 (see FIG. 15) for engagement by an appropriate, conventional pulling tool.

The retainer 28 may be a spring formed from rectangular wire bent into the form illustrated. The retainer 28 is preferably one piece and extends from end portion 100, to side portion 102, then to middle portion 104, then to side portion 106, and then to end portion 108. The side portions 102, 106 are configured to insert in the slots 70, 72 which extend through the side walls 58, 60 of the bracket portion 52 of the bracket 24.

The second end 98 of the stem 26 is positioned within the aperture 74 of the tubular portion 50 of the holding bracket 24 at the first end 54 thereof such that the enlarged head portion 90 of the stem 26 rests on the shoulder 80 of the inner wall 76 of the tubular portion 50.

The nut 22 is connected to the holding bracket 24 by the base portion 30 being positioned against the base portion 56 of the bracket portion 52 such that the protrusions 62, 64 on the base portion 56 are positioned within the recesses 38, 40 of the nut 22. When the side portions 102, 106 of the retainer 28 are received in the slots 70, 72 of the bracket portion 52 of the bracket 24, the retainer 28 is attached to the bracket portion 52 to hold the nut 22 within the confines defined by the bracket portion 52 and the retainer 28, but such that the nut 22 is allowed to float in at least one dimension, but preferably in three dimensions, in order to facilitate and permit alignment of a fastener, such as a bolt, with the nut 22.

The rivetless nut plate 20 also includes a sleeve member 25. Preferably, the sleeve member 25 is formed of a material such as 45Cb-55Ti Titanium Columbium, as Titanium Columbium is a high strength and ductile material that resists corrosion in the presence of, for example, a carbon fiber composite structure. Monel, Titanium alloys and other soft Nickel alloys are also good material selections for the sleeve 25, for similar reasons. Non-metallic materials with high tensile and shear strengths, such as Torlon or Parmax, would provide the desired corrosion protection and also offer a potential weight savings. The sleeve 25 allows the installation of the rivetless nut plate assembly 20 into composite structures, such as carbon fiber reinforced polymers (CFRP), in such a way that the mechanical properties of the installed rivetless nut plate conforms with NASM25027 for torque out and push out.

Figure 12:
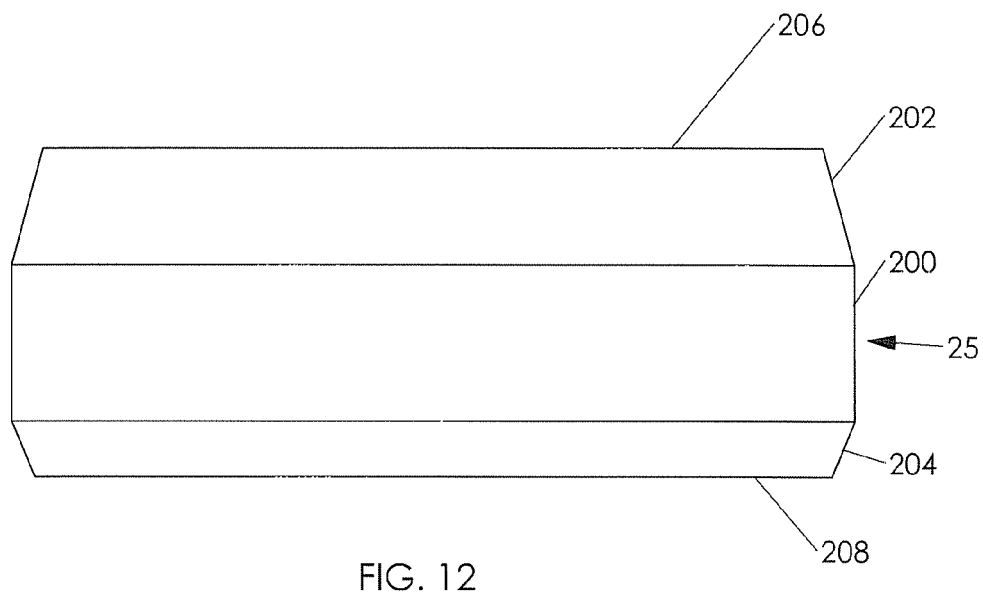
FIG. 12 is a side elevational view of a sleeve component of the nut plate assembly.
Figure 13:
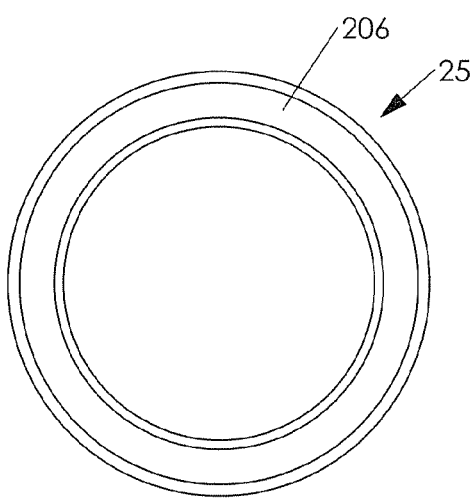
FIG. 13 is a top plan view of the sleeve.
Figure 14:
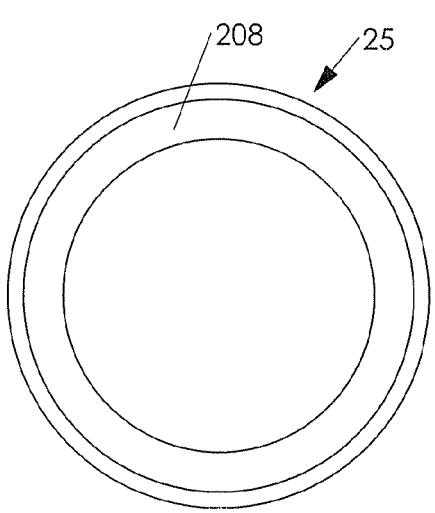
FIG. 14 is a bottom plan view of the sleeve.
Figure 12A:
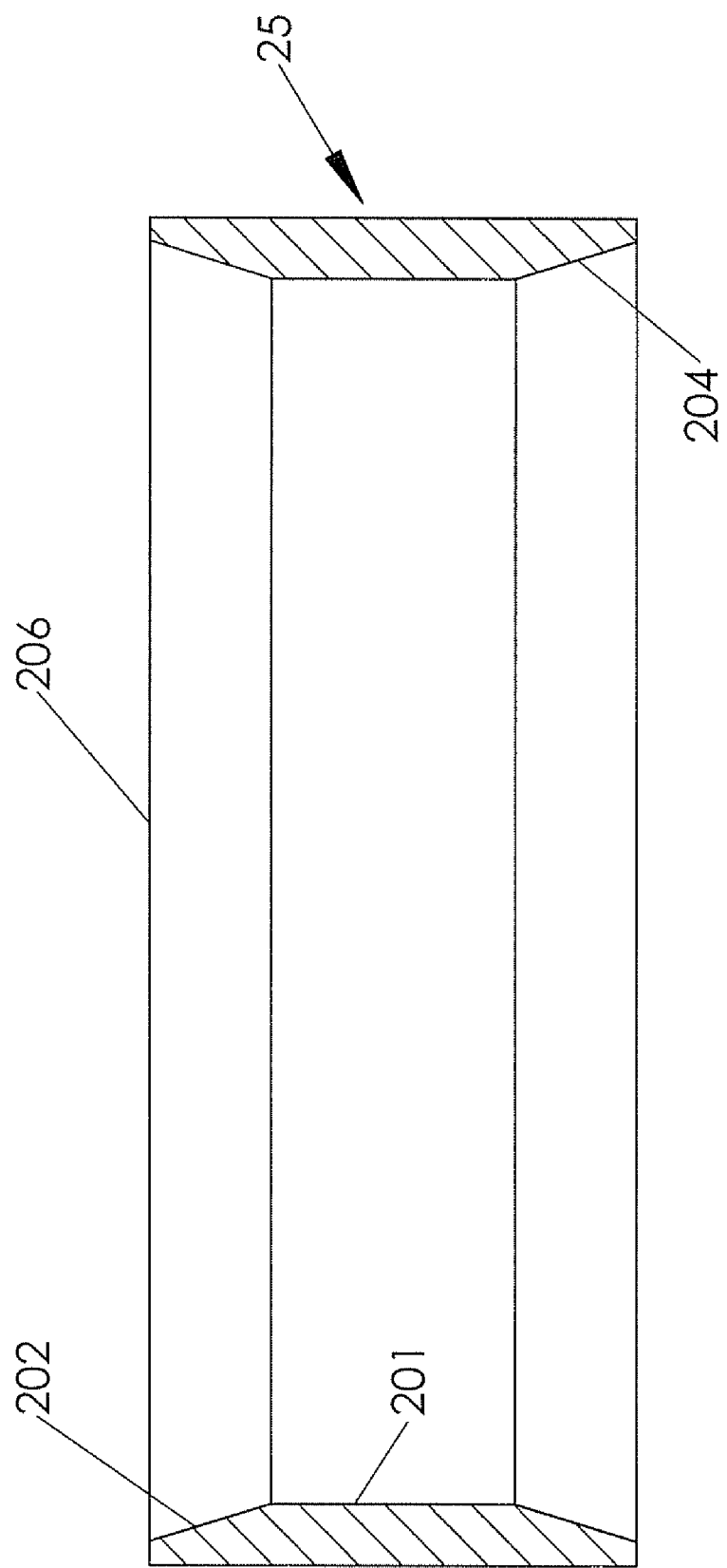
FIG. 12a is a cross-sectional view of an alternative sleeve component configuration which can be utilized in connection with the present invention.
Figure 12B:
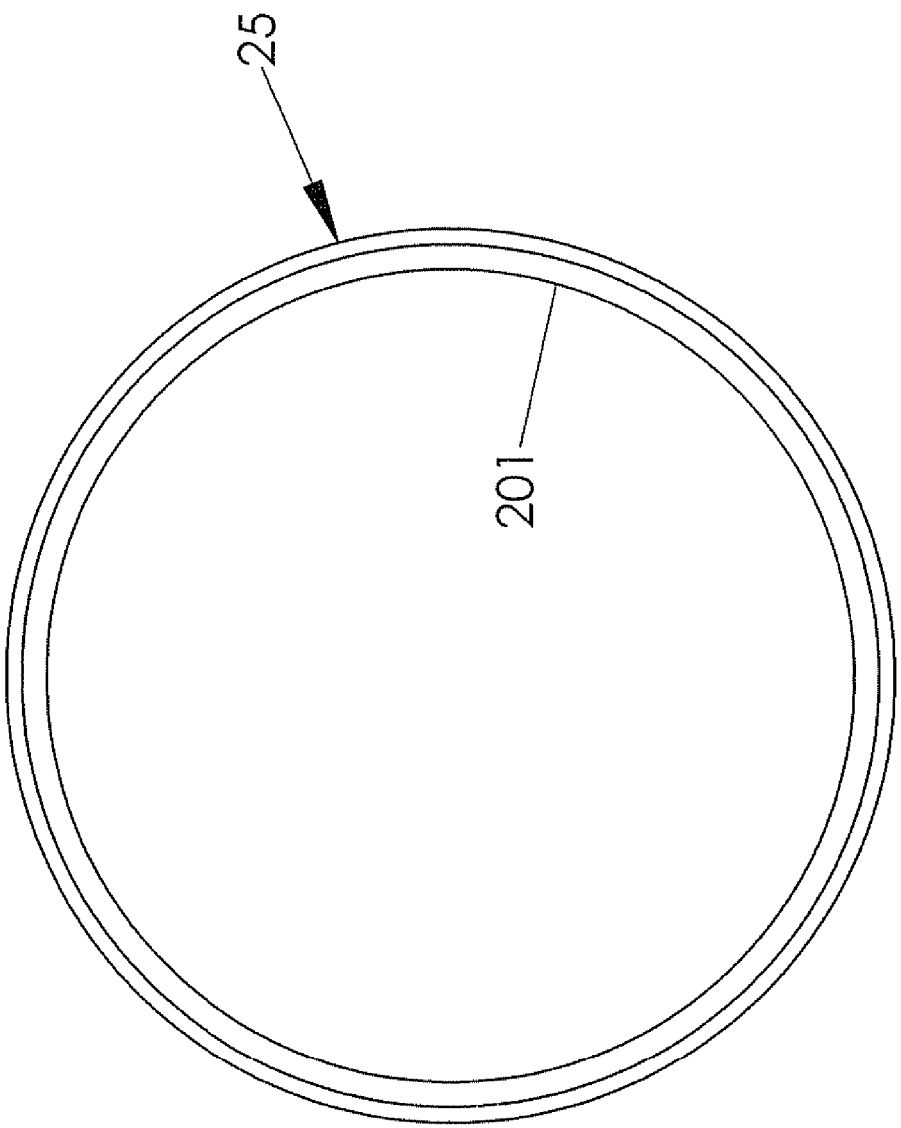

As shown in FIG. 12, preferably the outside surface 200 (or inside surface 201 as shown in FIGS. 12a and 12b) of the sleeve 25 has two chamfers 202, 204 (i.e., radii, fillets, or other types of geometrical impressions)—one chamfer 202 at the top 206 and one chamfer 204 at the bottom 208. These two chamfers 202, 204 allow the sleeve 25 to be used with the rivetless nut plate 20 described hereinabove. The top chamfer 202 is configured such that the sleeve 25 can accommodate the upper angled surfaces 89 of the lobes 88 (see FIG. 8) which protrude from the base 56 of the retainer 28, and the bottom chamfer 204 is configured to effectively function to accommodate a lip 300 which is provided on an inside surface 302 of the sleeve 25. In composite structures, such as a carbon fiber composite, any excessive radial expansion of the composite will cause the structure to delaminate. The chamfers 202, 204 on the sleeve 25 are provided to allow the angled surfaces 89 of the lobes 88 and the lip 300 room to expand within the sleeve 25 instead of within the composite structure, and the result is no delamination.

The outside surface 200 of the sleeve 25 is preferably provided as either being smooth or as having a shallow (i.e. not deep) geometrical pattern impressed into it. Preferably, the sleeve 25 does not have deep lobes and/or ribs around it, because it may cause delamination of the composite structure. Another option in lieu of providing shallow lobes on the outside surface 200 of the sleeve 25 is to mold or spray a non-metallic coating onto the outside surface 200, in order to increase the friction between the composite structure and the sleeve. The increased friction between the composite structure 110 and the sleeve 25 will allow the component to resist greater push out and torque out values. Yet another option is to add an epoxy to the outside surface 200 of the sleeve 25 to create a bond between the sleeve 25 and the composite workpiece structure 110. Although not specifically shown in the FIGURES, the sleeve 25 may include an optional geometry on its outside surface 200, such as a step wherein the outside surface 200 has effectively two outside diameters.

The sleeve member 25 also preferably has a length, defined as a distance from the top 206 of the sleeve 25 to the bottom 208 of the sleeve 25, which is substantially equal to a thickness of the workpiece 110, defined as a distance (dimension 209 in FIG. 3) from the top surface 114 to the bottom surface 116 of the workpiece 110. While the length of the tubular portion 50 of the holding bracket 24 is preferably equal to or less than the thickness of the workpiece 110, the length of the sleeve member 25 is preferably equal to or greater than the length of the tubular portion 50 of the holding bracket 24.

Preferably, the sleeve 25 is shaped such it can be press fit onto the bracket 24, i.e., onto the lobes 88. As such, preferably an inner diameter 120 (see FIG. 1) of the sleeve 25 is less than an outer diameter 122 (see FIG. 8) of the tubular portion 50 of the bracket 24.

In use, a hole or aperture 112 of a standard specified size is drilled into the composite structure 110 at the point where the rivetless nut plate 20 is needed. Then, the sleeve 25 is pressed onto the bracket 24, the stem 26 is positioned such that the head 90 of the stem 26 is in contact with the shoulder 80 of the bracket 24, and the elongated portion 94 extends through the aperture 74 in the tubular portion 50 of the bracket 24. Then, the nut 22 is placed on the bracket 24, and the retainer 28 is used to secure the nut 22 against the bracket 24 and effectively secure the head 90 of the stem 26 in the bracket 24.

Figure 2:
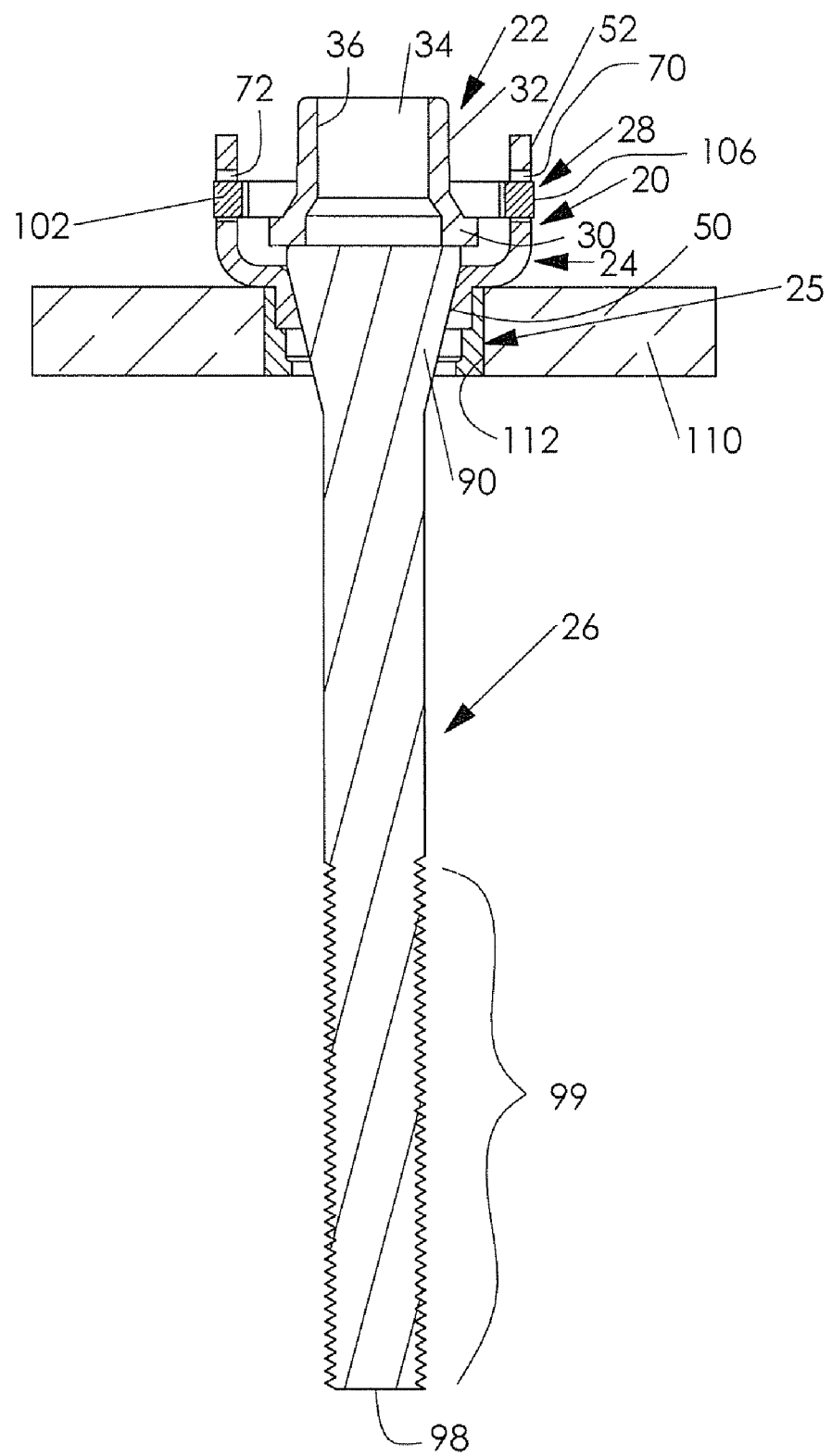
FIG. 2 is a side, cross-sectional view showing the nut plate assembly of FIG. 1 positioned for installation in a hole in a composite material workpiece.

The nut plate assembly 20, in its preassembled form, is then inserted into the aperture 112 of the workpiece 110 by inserting the second end 98 of the stem 26 and the tubular portion 50 of the holding bracket 24 and the sleeve 25 into the aperture 112 of the workpiece 110, such that the undersurface 86 of the bracket portion 52 of the holding bracket 24 sits on the top surface 114 of the workpiece 110, as illustrated in FIGS. 2 and 3. The aperture 112 has a depth (dimension 209 in FIG. 3) which is preferably larger than or equal to the length (dimension 162 in FIG. 3) of the tubular portion 50 of the holding bracket 24 such that the tubular portion 50 does not extend beyond the aperture 112 of the workpiece 110.

Figure 4:
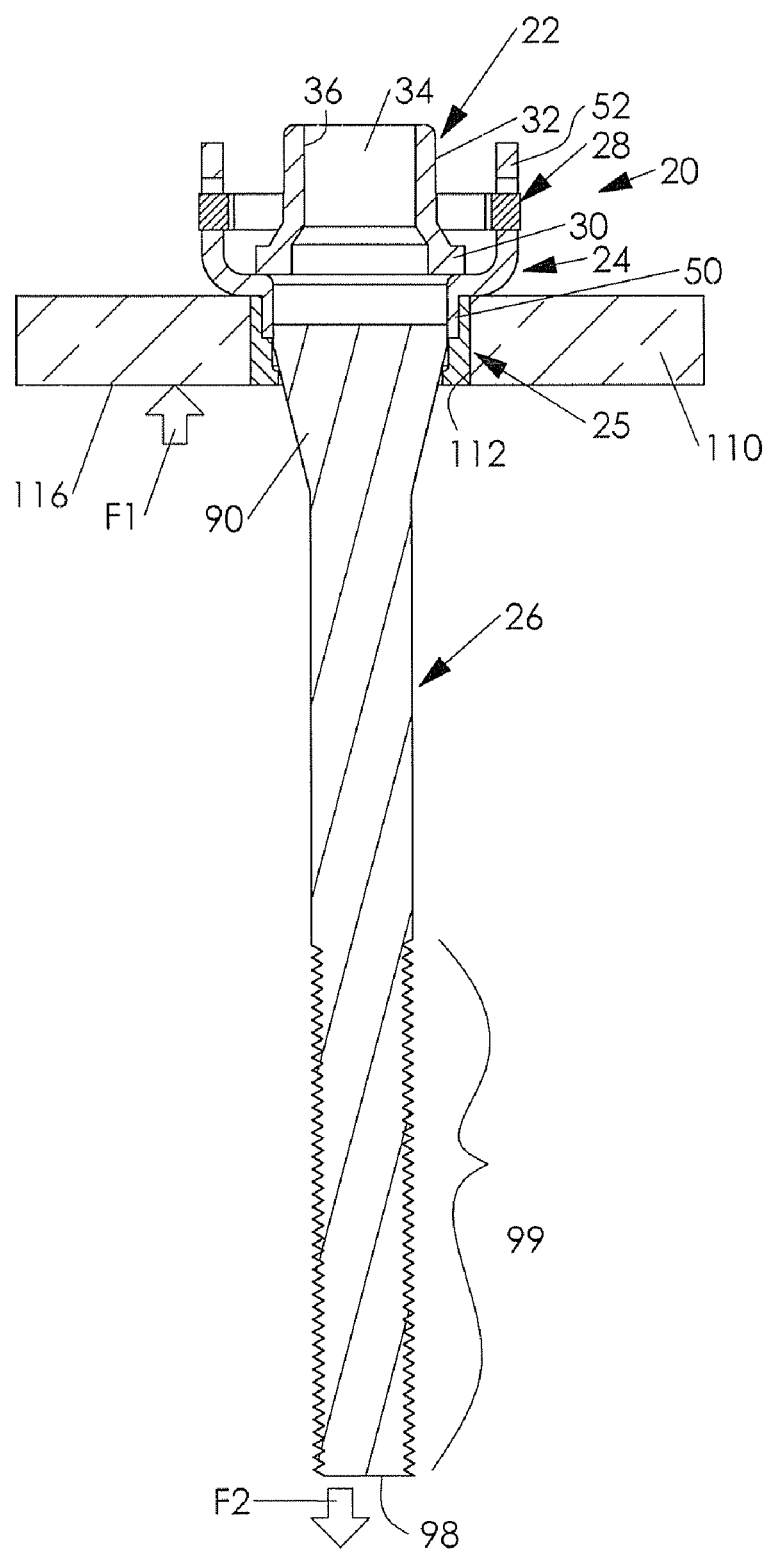
FIG. 4 is a side, cross-sectional view showing a head portion of a stem being pulled through the sleeve of the nut plate assembly.

Through the use of a pulling tool, a holding or abutment force F1 (see FIG. 4) is applied to the bottom surface 116 of the workpiece 110 and the tool engages the tool engaging section 96 of the stem 26 and applies a force F2 (see FIG. 4) to the stem 26 which is directed axially and in the opposite direction than the force F1 is applied to the workpiece 110. The force F2 on the stem 26 seats the tubular portion 50 and the bracket portion 52 of the holding bracket 24 firmly against and within the sleeve 25, as shown in FIGS. 4 and 5.

Through the use of the pulling tool, the head 90 of the stem 26 is pulled through the tubular portion 50 of the bracket 24, expanding both the tubular portion 50 of the bracket 24 and the sleeve 25, creating interference between the bracket 24 and sleeve 25, as well as interference between the sleeve 25 and the composite material workpiece 110. This radial expansion and resulting interference creates the interlocking and interference necessary to obtain the required mechanical properties for the rivetless nut plate 20. The sleeve 25 is pliable to interlock with the tubular portion 50 of the bracket 24 and create the necessary interference load with the composite structure 110 from this radial expansion, while not causing delamination of the composite workpiece structure 110.

The enlarged head portion 90 of the stem 26 initially expands the tubular portion 50 as well as places a compressive load on the components to seat them against the top surface 114 of the workpiece 110. The tubular portion 50 expands to engage the sleeve 25. As this occurs, the head 90 of the stem 26 continuously deforms the tubular portion 50 radially outwardly to engage the sleeve 25 with sufficient force to cause the lobes/ribs 88, or alternate structure, if provided, on the outer wall 78 of the tubular portion 50 to embed in the interior wall 302 of the sleeve 25. As can be appreciated, the increasing wall thickness of the tubular portion 50 insures that radial deformation continues along the entire length of the tubular portion 50 to attain the desired degree of engagement of the lobes/ribs 88 in the wall 302 of the sleeve 25 such that improved push-out, pull-out, torque-out and fatigue characteristics are achieved.

Figure 6:
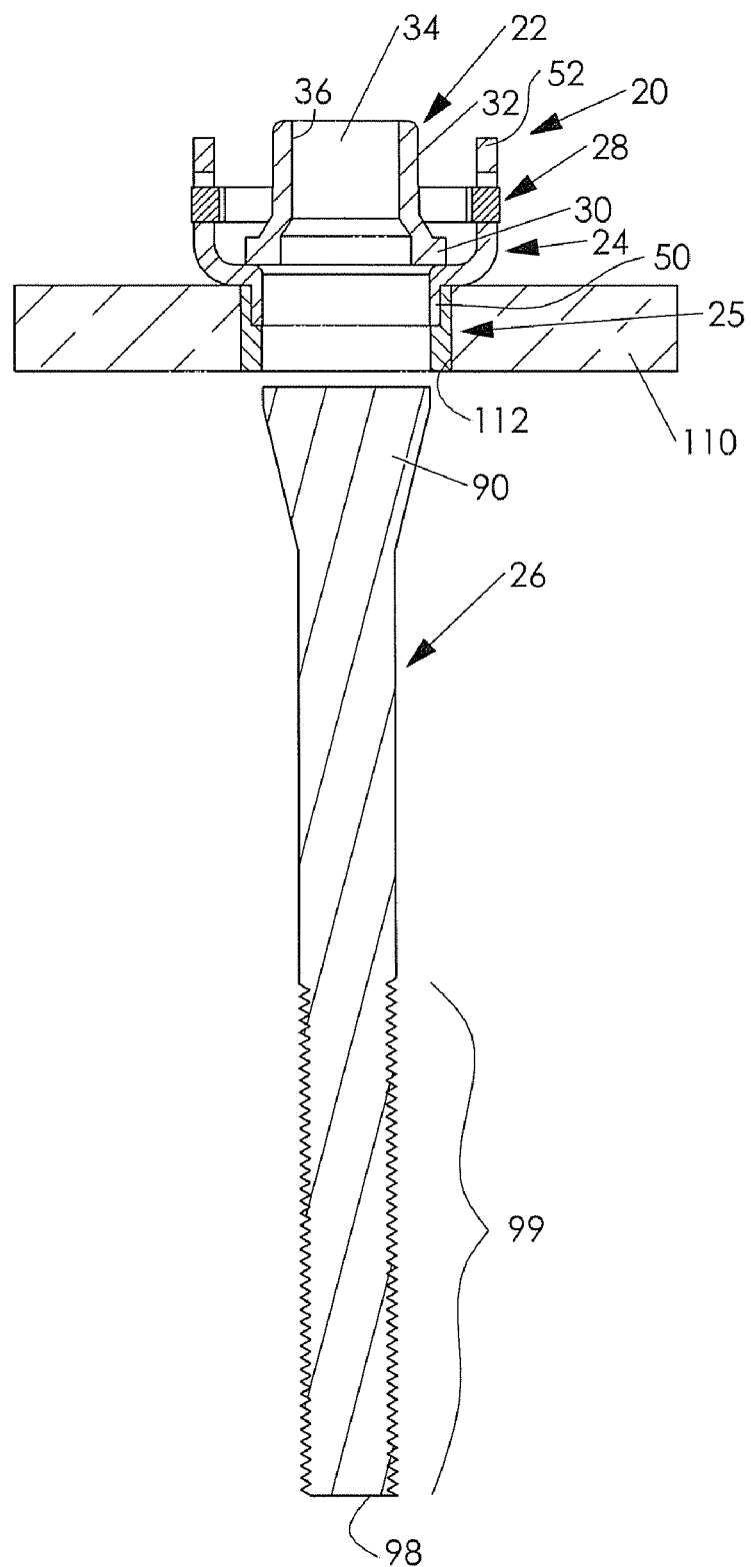
FIG. 6 is a side, cross-sectional view showing the nut plate assembly fully installed, after the head portion of the stem has been pulled completely through the sleeve of the nut plate assembly.
Figure 7:
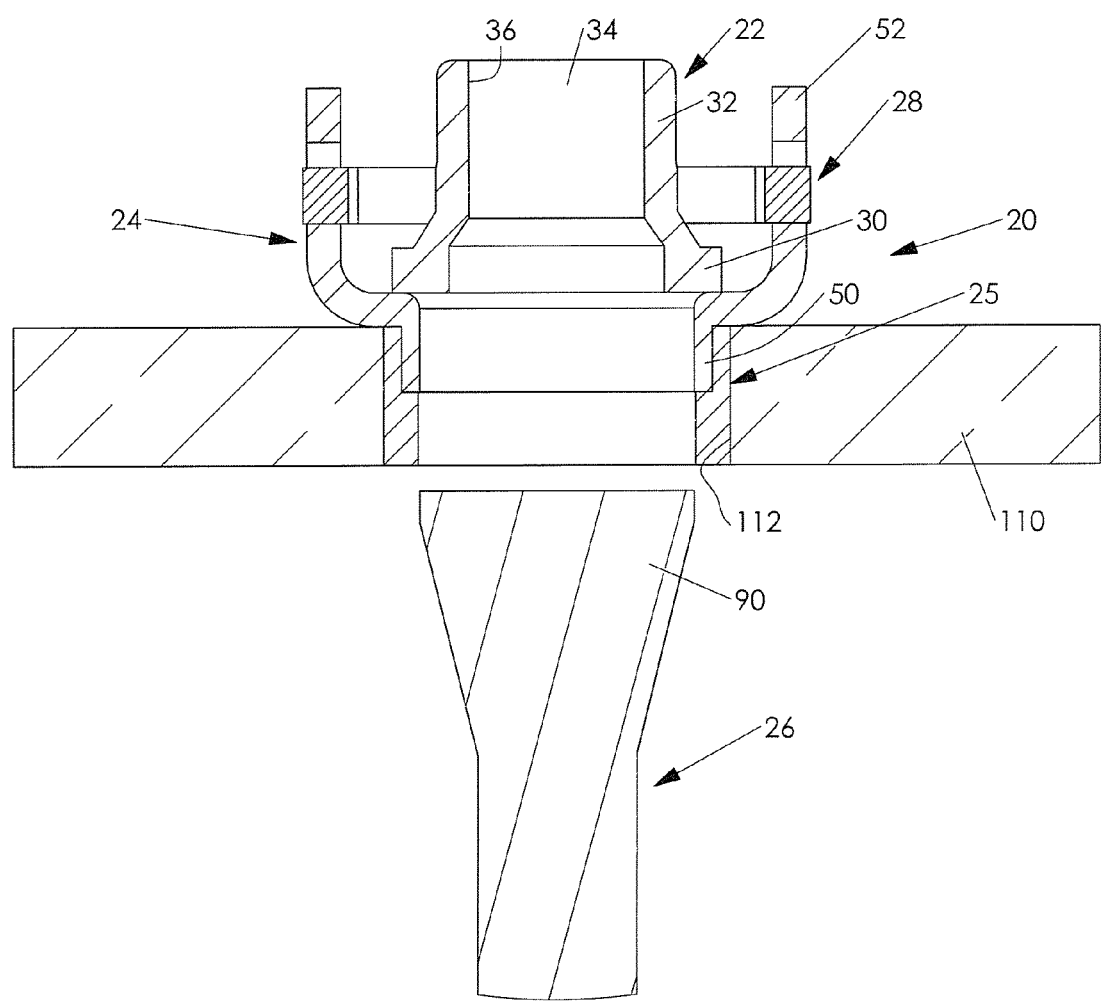
FIG. 7 is similar to FIG. 6, showing a portion thereof enlarged.

When the enlarged head portion 90 is pulled completely through the aperture 74 of the tubular portion 50, as shown in FIGS. 6 and 7, the holding bracket 24 becomes effectively attached to the sleeve 25 and the sleeve 25 become effectively attached to the workpiece 110, and the stem 26 can be discarded. In addition to the holding bracket 24 being effectively attached to the sleeve 25 and the sleeve 25 being effectively attached to the workpiece 110, the nut 22 is secured within the holding bracket 24 by the retainer 28. With the nut plate 20 attached to the workpiece 110, a fastener, such as a bolt, can then be attached to the nut plate 20 and a second workpiece can be secured to the workpiece 110.

This embodiment of the present invention provides a practical means for attaching a nut plate to a composite structure without the need for satellite rivets or glue. Application of this product decreases cost due to time savings during installation, decreases the chances of a failed installation, and most importantly, a failed structure.

Figure 17:
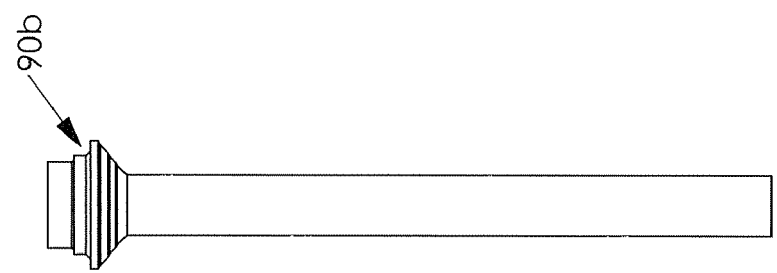
FIG. 15-17 illustrate three different mandrel head designs which can be used in association with the installation of the rivetless nut plate shown in FIG. 1.
Figure 16:
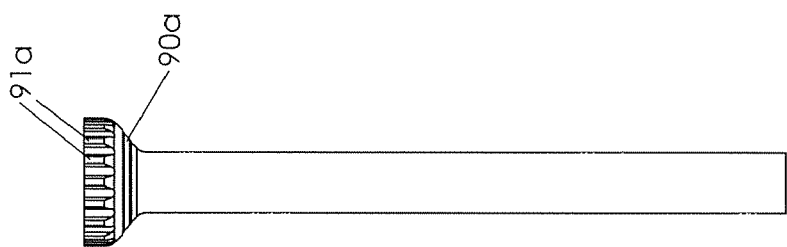

To improve performance, an alternative mandrel head design can be used. Specifically, a mandrel head 90a can be provided as being solid but having ribs 91a thereon as shown in FIG. 16, or a mandrel head 90b can be provided as being deformable as shown in FIG. 17. Both of these mandrel head designs function to enhance the interlocking action between the bracket 24, the sleeve 25, and the composite workpiece structure 110.

Figure 18:
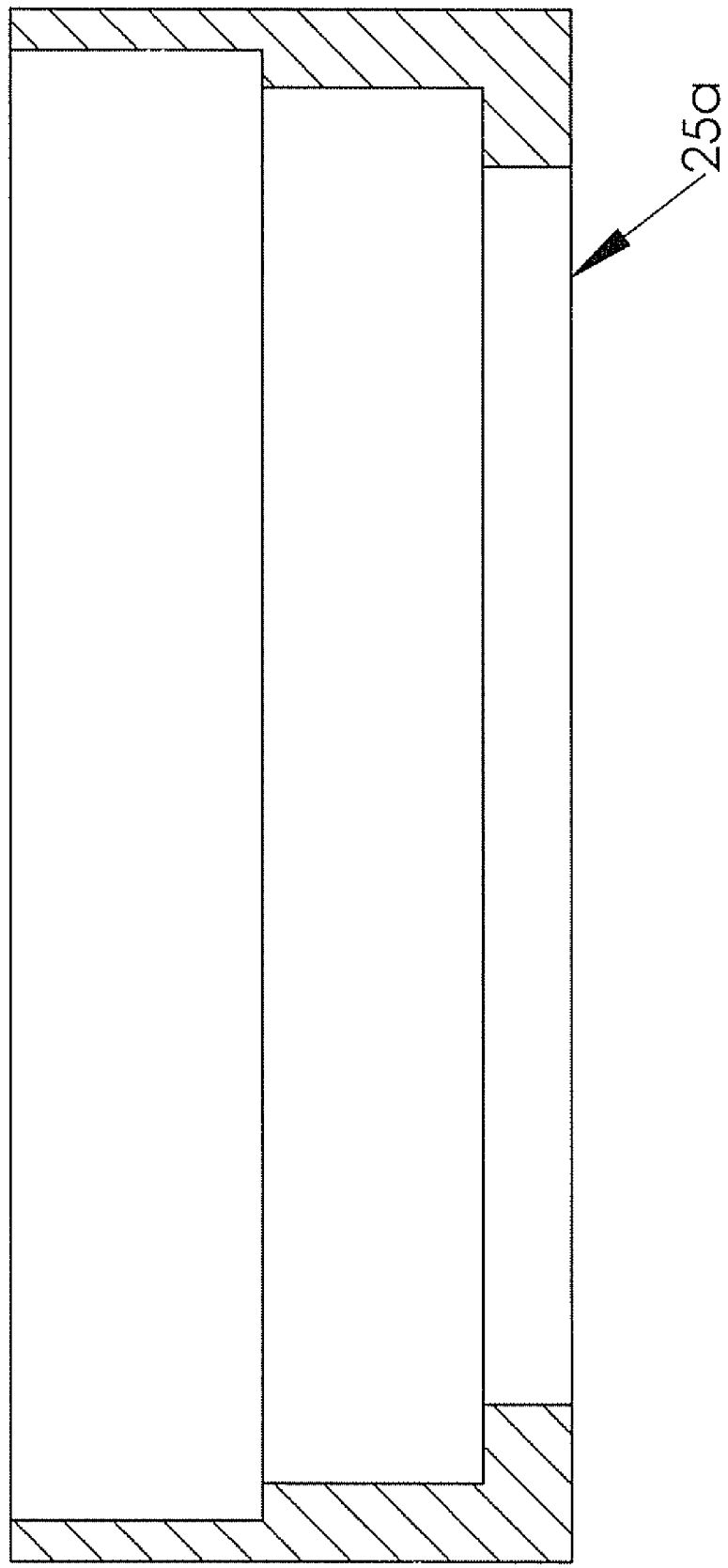
FIG. 18 is a cross-sectional view of an alternative sleeve component configuration which can be utilized in connection with the present invention.
Figure 18A:
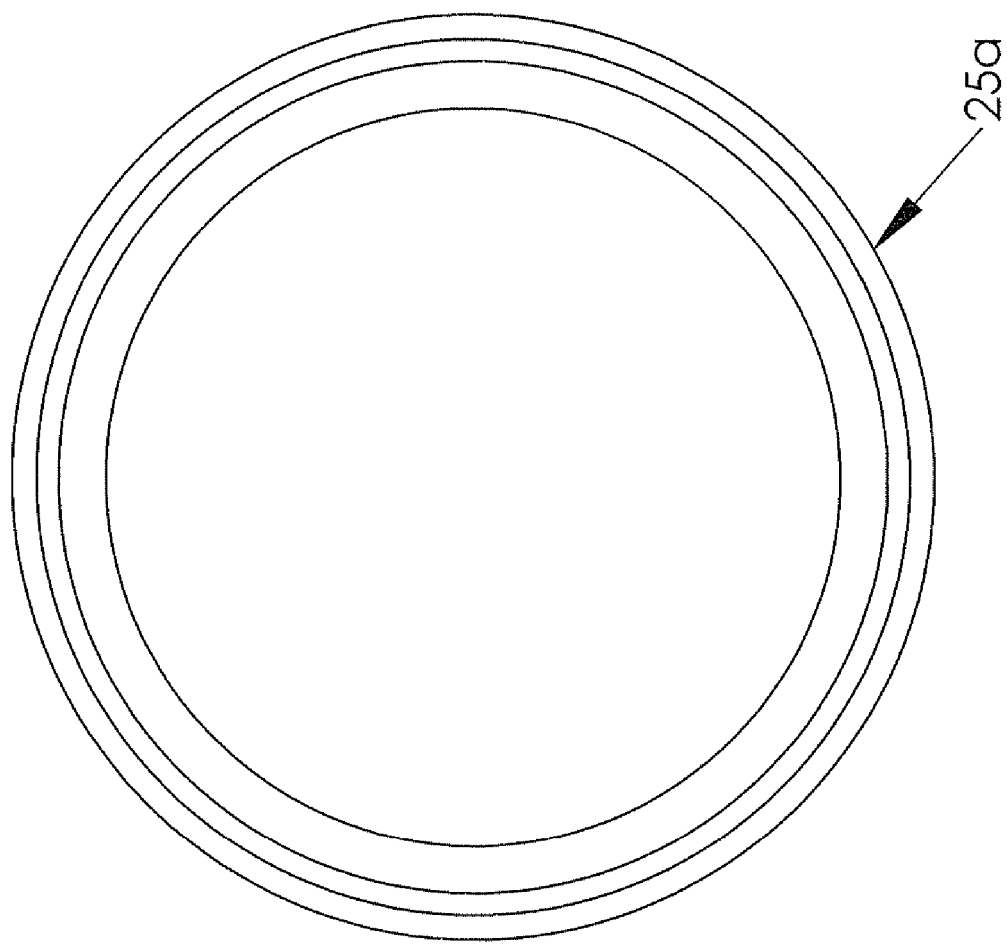
FIG. 18a is a top view of the alternative sleeve component shown in FIG. 18.
Figure 18B:
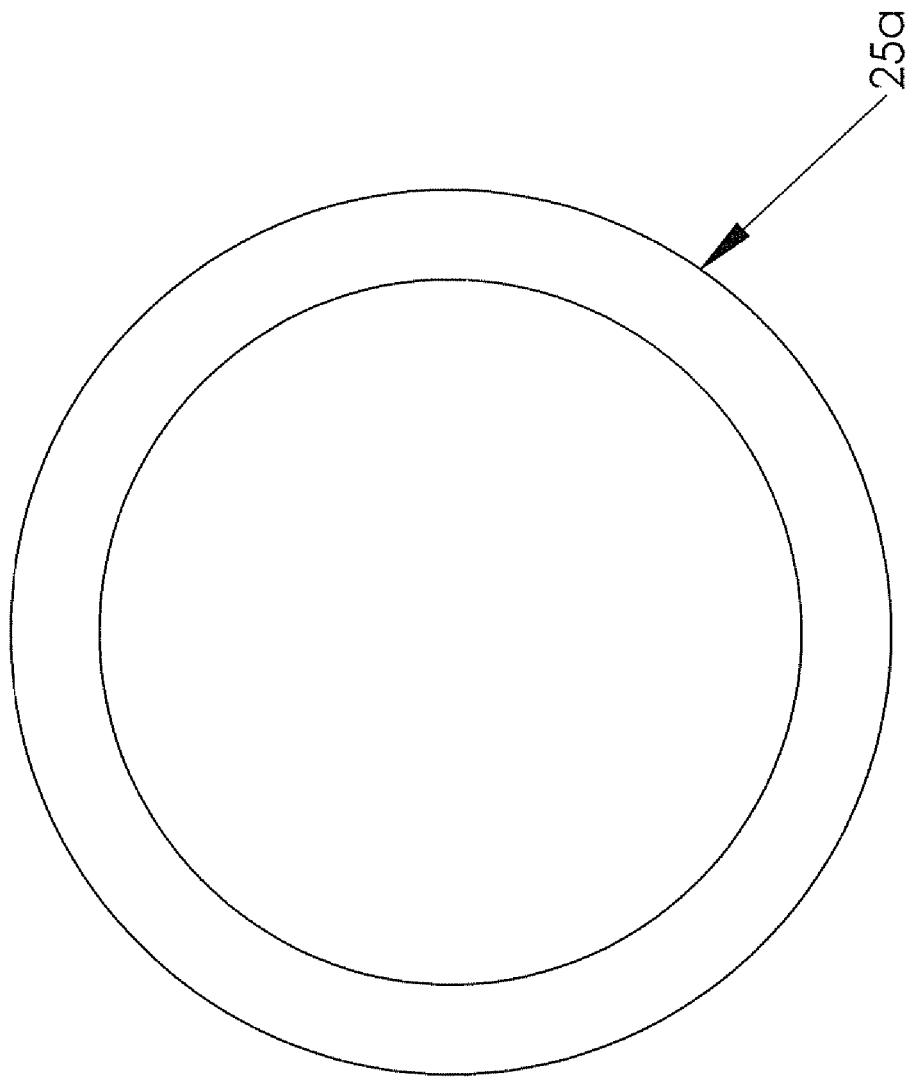
FIG. 18b is a bottom view of the alternative sleeve component shown in FIG. 18.
Figure 19:
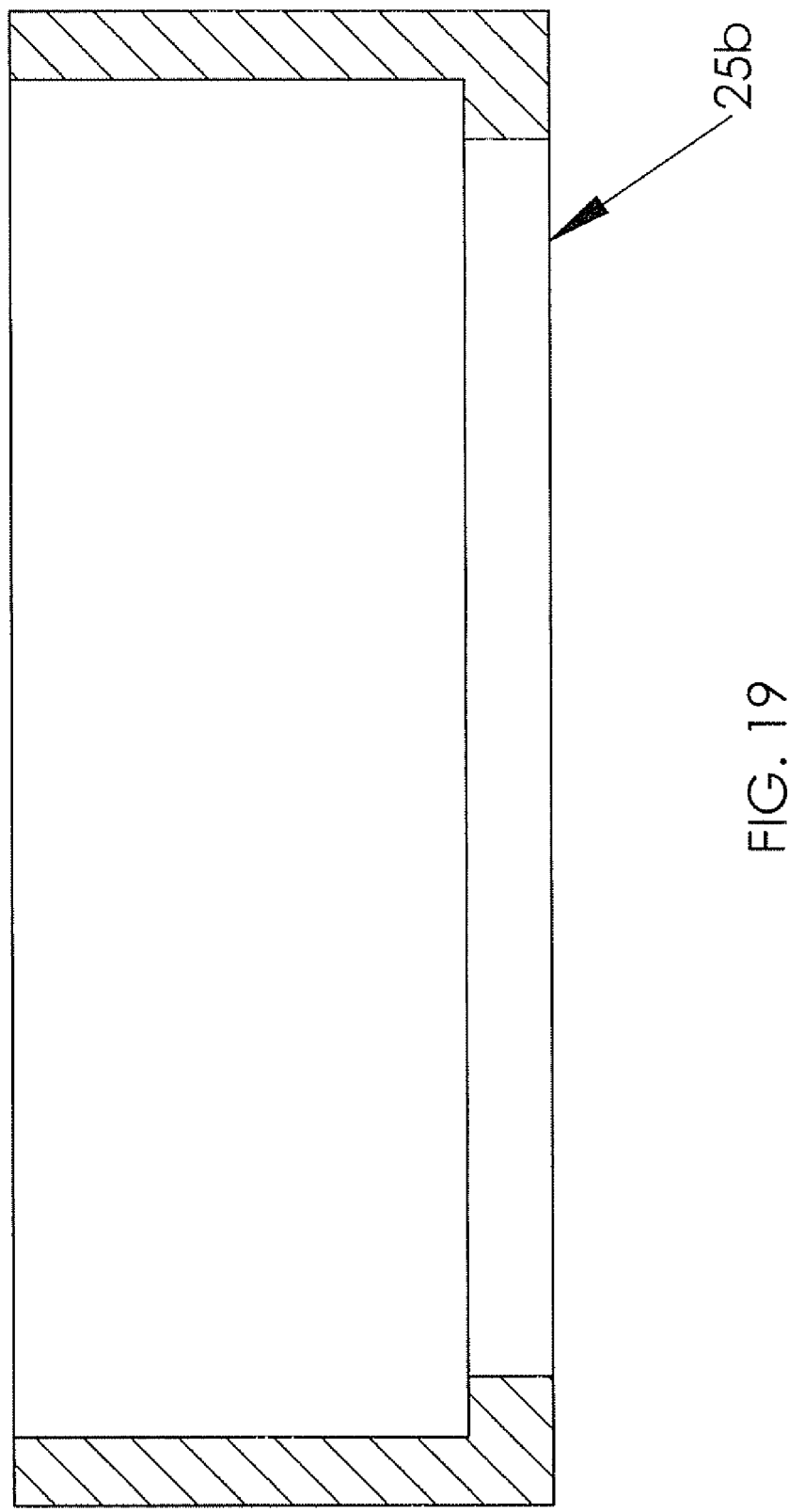
FIG. 19 is a cross-sectional view of an alternative sleeve component configuration which can be utilized in connection with the present invention.
Figure 19B:
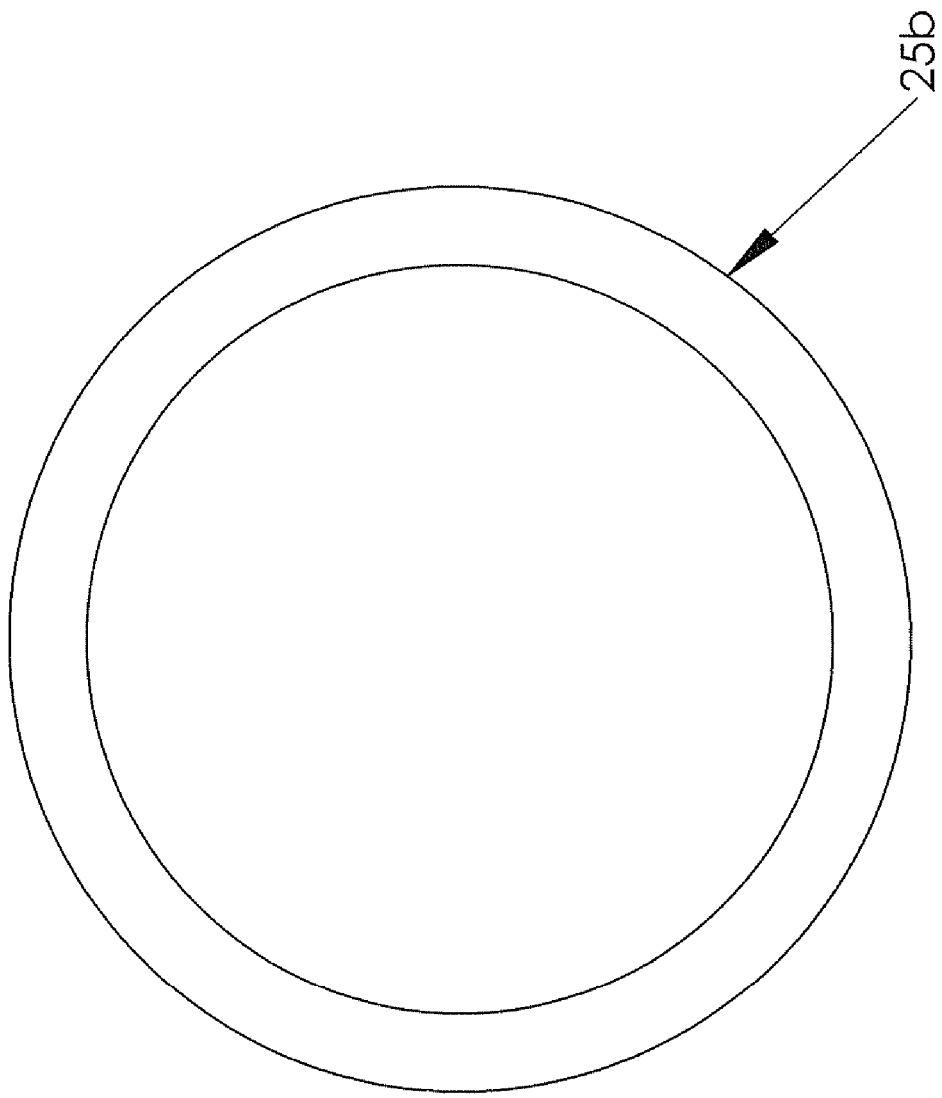
FIG. 19b is a bottom view of the alternative sleeve component shown in FIG. 19.
Figure 20:
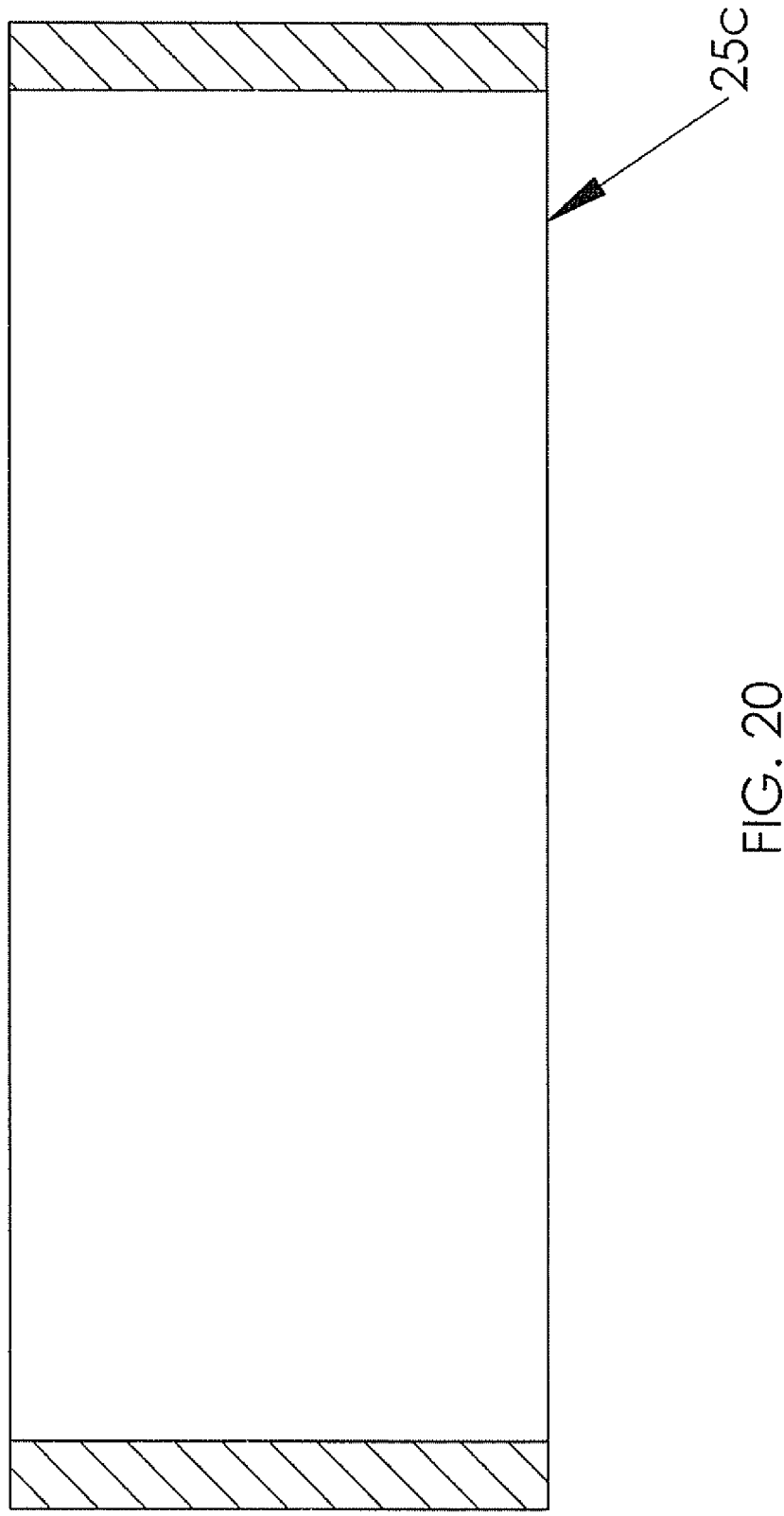
FIG. 20 is a cross-sectional view of an alternative sleeve component configuration which can be utilized in connection with the present invention.
Figure 20A:
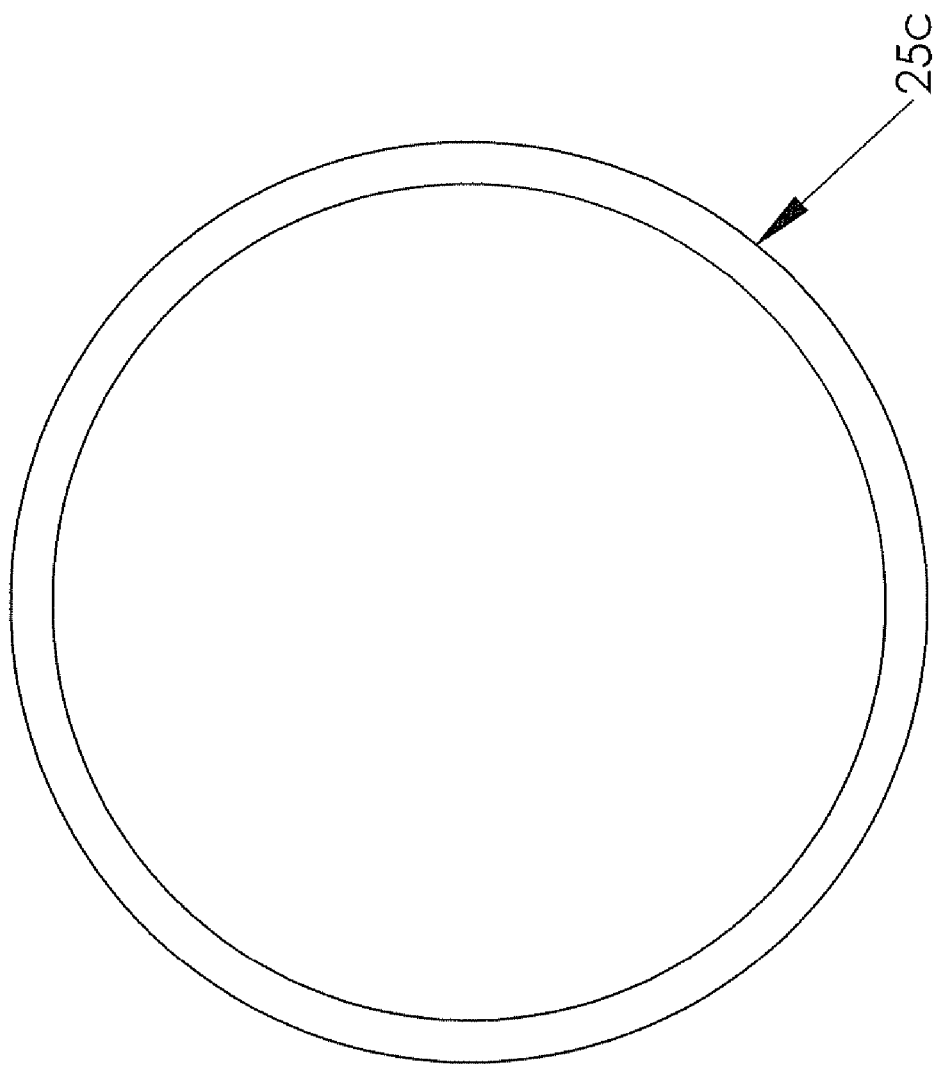
FIG. 20a is a top (and bottom) view of the alternative sleeve component shown in FIG. 20.

While preferred embodiments of the invention are shown and described, it is envisioned that those skilled in the art may devise various modifications without departing from the spirit and scope of the foregoing description. For example, FIGS. 18, 19 and 20 illustrate (in side cross-section) alternative sleeve component configurations 25a, 25b, 25c which can be utilized (FIGS. 18a and 18b provide top and bottom views, respectively, of the alternative sleeve configuration 25a shown in FIG. 18, while FIGS. 19a and 19b provide top and bottom views, respectively, of the alternative sleeve configuration 25b shown in FIG. 19. FIG. 20a provides a top (and bottom) view of the alternative sleeve component 25c shown in FIG. 20.) Still other variations of the sleeve and other components are possible while staying within the scope of the present invention.

What is claimed is:

1. A rivetless nut plate assembly which is configured for installation into an aperture of a composite material workpiece without risking delamination of the workpiece, said installation being effected by pulling a stem through the assembly, said rivetless nut plate assembly comprising: a nut; a holding bracket; a retainer which engages the holding bracket and retains the nut on the holding bracket; and a sleeve member which engages the workpiece and the holding bracket, wherein the sleeve member is made of a high strength and ductile material, wherein an outside or inside surface of the sleeve member has two chamfers, wherein the two chamfers comprise a first chamfer at a top of the sleeve member and a second chamfer at a bottom of the sleeve member, wherein the top chamfer is configured such that the sleeve member can accommodate upper angled surfaces of lobes which protrude from a base of the holding bracket, and the bottom chamfer is configured to function to accommodate a lip which is provided on an inside surface of the holding bracket, wherein the two chamfers on the sleeve member are provided to allow angled surfaces of the lobes and the lip room to expand within the sleeve member instead of within the composite structure workpiece.

2. A rivetless nut plate assembly as recited in claim 1, wherein the sleeve member is made out of at least one of Titanium Columbium, Monel, a Titanium alloy, a Nickel alloy, Torlon and Parmax.

3. A rivetless nut plate assembly as recited in claim 1, wherein the sleeve member is formed of 45Cb-55Ti Titanium Columbium.

4. A rivetless nut plate assembly as recited in claim 1, wherein an outside surface of the sleeve member is smooth.

5. A rivetless nut plate assembly as recited in claim 1, wherein an outside surface of the sleeve member has a geometrical pattern impressed thereinto.

6. A rivetless nut plate assembly as recited in claim 1, wherein an outside surface of the sleeve member has a non-metallic coating thereon, thereby providing increased friction between the composite structure workpiece and the sleeve member.

7. A rivetless nut plate assembly as recited in claim 1, wherein an outside surface of the sleeve member has an epoxy thereon, thereby creating a bond between the sleeve member and the composite workpiece structure.

8. A rivetless nut plate assembly as recited in claim 1, wherein the sleeve member has a length which is equal to a thickness of the workpiece.

9. A rivetless nut plate assembly as recited in claim 1, wherein the sleeve member is press fit onto lobes on the holding bracket.

10. A rivetless nut plate assembly as recited in claim 1, wherein the nut comprises a base portion and a cylindrical portion which extends upwardly from the base portion, wherein a threaded aperture is provided through the base portion and the cylindrical portion.

11. A rivetless nut plate assembly as recited in claim 10, wherein the base portion includes end recesses and axially projecting end portions situated on opposite sides of the end recesses.

12. A rivetless nut plate assembly as recited in claim 1, wherein the holding bracket is generally Y-shaped and comprises a tubular portion and a bracket portion which extends outwardly from the tubular portion.

13. A rivetless nut plate assembly as recited in claim 12, wherein the bracket portion of the holding bracket comprises a base portion and opposed upstanding side walls, wherein the base portion comprises a pair of protrusions which protrude upwardly from the base portion and slots which extend through the side walls of the bracket portion.

14. A rivetless nut plate assembly as recited in claim 13, wherein the tubular portion extends in an opposite direction from the base portion of the bracket portion than do the side walls and the protrusions of the bracket portion.

15. A rivetless nut plate assembly as recited in claim 14, wherein the tubular portion has an aperture therethrough which defines an inner wall of the tubular portion, and the tubular portion has an outer wall, wherein from a first end of the tubular portion, the inner wall curves inwardly to provide a shoulder, wherein from the shoulder to a second end of the tubular portion, the inner wall is tapered such that a diameter of the inner wall is gradually reduced.

16. A rivetless nut plate assembly as recited in claim 15, wherein the inner wall is configured to have a lip provided proximate to the second end which further reduces the diameter of the inner wall.

17. A rivetless nut plate assembly as recited in claim 16, wherein the outer wall of the tubular portion extends from an undersurface of the bracket portion to the second end of the tubular portion, wherein ribs extend outwardly from the outer wall of the tubular portion, and each rib includes an upper angled surface.

18. A rivetless nut plate assembly as recited in claim 1, wherein the retainer comprises a spring formed from rectangular wire bent into a form.

* * * * *